United States Patent [19]

Ousborne

[11] Patent Number: 5,499,182
[45] Date of Patent: Mar. 12, 1996

[54] VEHICLE DRIVER PERFORMANCE MONITORING SYSTEM

[76] Inventor: Jeffrey Ousborne, 5606 Foxview Ct., Clarksville, Md. 21029

[21] Appl. No.: 350,848

[22] Filed: Dec. 7, 1994

[51] Int. Cl.[6] ................................................. G06F 13/00
[52] U.S. Cl. ........................ 364/424.04; 364/424.03; 364/551.01; 340/439
[58] Field of Search ........................... 364/550, 551.01, 364/424.03, 424.04, 431.01, 460, 461; 340/438, 435, 439, 436

[56] References Cited

U.S. PATENT DOCUMENTS

| | | | |
|---|---|---|---|
| 4,258,421 | 3/1981 | Juhasz et al. | 364/424.04 |
| 5,046,007 | 9/1991 | McCrery et al. | 364/424.03 |
| 5,113,344 | 5/1992 | Kellogg et al. | 364/424.04 |
| 5,303,163 | 4/1994 | Ebaugh et al. | 364/424.04 |
| 5,325,082 | 6/1994 | Rodriguez | 364/424.04 |
| 5,357,438 | 10/1994 | Davidian | 364/461 |
| 5,374,917 | 12/1994 | Hoffman et al. | 340/438 |
| 5,394,136 | 2/1995 | Lammers et al. | 364/424.04 |

*Primary Examiner*—Gary Chin
*Attorney, Agent, or Firm*—Morton J. Rosenberg; David I. Klein

[57] ABSTRACT

A vehicle driver performance monitoring system is provided. A plurality of vehicle component sensors (40–43) suitably mounted to a host vehicle measure a plurality of vehicle component parameters indicative of a host vehicle's driver performance. A microprocessor module (1) detachably coupled to the vehicle mounting unit (2) affixed to and uniquely designated for a given host vehicle poles each vehicle sensor (40–43) of that host vehicle to read, process, and store the vehicle operation data generated thereby. A playback mounting unit (3) is provided to facilitate the connection of a remote computer to the host vehicle's microprocessor module (1) in order to establish digital communication whereby the vehicle operation data and the analysis results processed therein are retrieved and displayed for a user.

20 Claims, 3 Drawing Sheets

VEHICLE DRIVER PERFORMANCE MONITORING SYSTEM

FIELD OF THE INVENTION

The subject driver performance monitoring system is generally directed to an onboard computer system for operation on a designated host vehicle. More specifically, the vehicle driver performance monitoring system is an onboard computer system which has in place the hardware and software means to sense various vehicle operation parameters, characterize the driving habits of the current driver based on those parameters with respect to various specified determinants, and make available processed information for digital read-out and display.

The quality of a driver's performance in driving the host vehicle is invariably reflected generally in the physical manipulation of that vehicle and particularly in the parametric variations of that vehicle's electrical/mechanical components. Accordingly, the subject vehicle driver performance monitoring system includes a plurality of parametric sensors which measure the physical parameters associated with the host vehicle components to which they are respectively coupled and generate electrical signals indicative of those measured quantities. The data derived from the formulation of these signals is continually processed and stored during operation of the host vehicle such that updated assessments of the driver's performance in light of various pre-specified performance determinants may be computed.

The need for such driver performance assessments, as provided by the subject vehicle driver performance monitoring system, is manifest in several readily apparent applications. First, parents of driving-aged children well recognize the demonstrated tendency of many teenage drivers to operate an automobile in a less than conservative, often reckless, manner. As they cannot accompany their children in a vehicle at all times, and as their children will rarely operate an automobile in a reckless manner in their immediate presence, those parents currently lack the means to monitor their children's driving habits and, in many cases, lack the information to even suspect that their children in fact exercise poor driving habits. The subject vehicle driver performance monitoring system would provide the continually monitored driving performance information which they critically need in order to maintain control over their children's driving habits and thereby preserve the health and safety of not only their own children, but occupants of other automobiles and bystanders on public streets.

Businesses also possess a discernable need for the driving performance assessments provided by the subject vehicle driver performance monitoring system. It is imperative for any business owning employee-operated vehicles to monitor the driving habits of their employees during the operation of those vehicles. The current practice of many such businesses is to visibly mount on their vehicles signs which solicit complaints from anyone observing careless operation of those vehicles. Except when observers occasionally lodge a legitimate complaint in response to these signs, such businesses are relegated to after-the-fact reports of accidents and other driver-responsible occurrences, or incidental observations, to discover the poor driving habits of their employees. This not only compromises public safety, it also heightens for businesses the expenses they must allocate for costs associated with otherwise avoidable accidents and the increased insurance premiums resulting from them. Moreover, the lack of satisfactory means to effectively monitor employee driving habits deprives businesses of an opportunity to improve the driving performance of their employees and, thereby, actually reduce business expenses while promoting public safety.

Another significant application anticipated for the subject vehicle driver performance monitoring system is in the automobile insurance business wherein accurate assessments of driving habits would facilitate accurate and fair allocations of costs. As most automobile insurance companies currently rely primarily on age, sex, and the driving record of the insured individual in estimating the risk of insurance payouts caused by that individual, only marginal estimates of such risks are attained; and unfair assessments of the applicable insurance premium for that individual often result. Reckless though fortunate drivers, who but for the care fortuitously employed by other drivers, have avoided serious automobile accidents are regularly assessed an insurance premium as low as, if not lower than, more careful drivers but unfortuitous drivers who, except for a single unavoidable traffic incident, would have an unblemished driving record. Similarly, careless automobile owners who mistreat their vehicles or push the operation of their vehicles beyond their performance tolerances regularly pay the same, if not lower, premium as do more caring vehicle owners who invest substantial effort to minimize the wear and tear on their vehicles. The accurate assessments of driving performance provided by the subject vehicle driver performance monitoring system would enable automobile insurance companies to remedy these inequities and, as well, reduce their own expenses by appropriately allocating higher costs only among the highest risk drivers. This would enable insurance companies to both attract more careful drivers and encourage safer driving habits even in the most reckless of drivers they already insure.

PRIOR ART

Onboard vehicle computer systems which incorporate means for sensing vehicle component parameters are known in the art. The best prior art known to Applicant includes U.S. Pat. Nos. 5,207,095; 5,034,894; 5,074,144; 4,500,868; 4,933,852; 4,716,458; 4,275,378; 4,093,039; 5,150 609; 4,945,759. Such known systems, however, are directed primarily to performing vehicle diagnostics, assessing vehicle performance, or training an operator to master various facets of vehicle operation. There is no onboard computer system heretofore known which continually monitors the driver performance of a host vehicle as comprehensively as does the subject vehicle driver performance monitoring system.

For instance, U.S. Pat. No. 5,207,095 is directed to an onboard vehicle computer system for use in evaluating an operator's braking technique which employs a plurality of vehicle-mounted sensors. The onboard computer in that system periodically receives and stores the parametric values associated with vehicle braking sensed by the sensors. The data thus generated by that computer is then available to be read later by an instructor who will compare the recorded parametric values to formulate further instructive steps. Unlike the subject vehicle driver performance monitoring system, however, that system does not perform evaluative functions on the data. Any evaluations to be made in light of the raw data are left for the user to make himself or herself. Furthermore, as the vehicle sensor monitoring system there is intended specifically as an instructional tool, monitoring is performed only during those discrete time intervals related to an instructional session. It is not performed in correlation continually with the host vehicle's operation, as is the monitoring in the subject vehicle driver performance monitoring system.

In addition, the intended instructional applications for that system reveal no apparent need to question driver integrity; therefore no driver integrity checking means are therein provided. In the subject vehicle driver performance monitoring system, however, the integrity of the host vehicle driver is an ever-present concern, the compromise of which would wholly undermine the utility of the system. The subject vehicle driver performance monitoring system therefore includes means for recording any attempt to either operate a given system on a vehicle other than the uniquely identified host vehicle for which it is configured or to otherwise tamper with proper system operation.

U.S. Pat. No. 5,034,894 directs itself to a self-diagnosis computer system onboard a motor vehicle wherein a plurality of detectors are mounted on that vehicle's engine to detect any aberrant operating conditions. Although the computer system there performs continual monitoring while the vehicle is in operation, no provision is made for the assessment of driver performance based on any sensed parameters.

Similarly, U.S. Pat. No. 5,074,144 is directed to an onboard vehicle computer system for monitoring vehicle performance. Various transducers for continually monitoring various vehicle parameters are employed in that system; however, comprehensive means for analyzing the measured vehicle parameters to characterize or assess driver performance, per se, are not provided.

DESCRIPTION OF THE PREFERRED EMBODIMENTS

Figure 1:
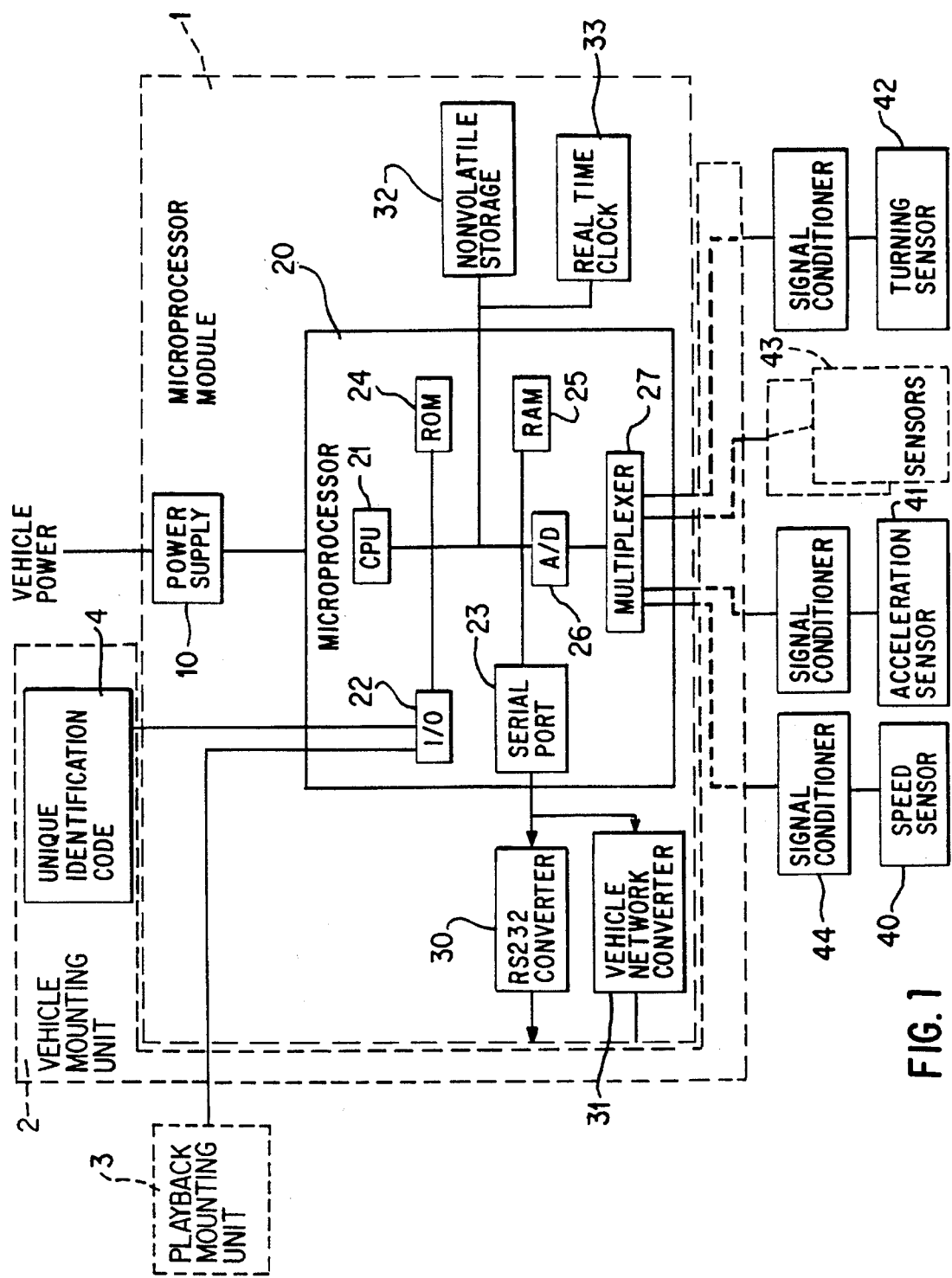
FIG. 1 is a block diagram showing the major functional components of the subject driver performance system.

Referring now to FIG. 1, the subject vehicle driver performance monitoring system generally includes a microprocessor module 1, vehicle mounting unit 2, playback mounting unit 3, a plurality of vehicle sensors 40–43, and software to be described in paragraphs to follow for system control, as well as data processing and analysis. Microprocessor module 1 is preferably a self-contained, detachable modular unit which must be coupled to vehicle mounting unit 2 in order for the subject vehicle driver performance monitoring system to be operational. All external interconnections leading to and from microprocessor module 1 shown in the functional flow diagram of FIG. 1, with the exception of that interconnection between microprocessor input/output (I/O) port 22 of microprocessor 20 and playback mounting unit 3, are physically interfaced through the mounting of microprocessor module 1 onto vehicle mounting unit 2. Thus, microprocessor module 1 may be readily detached from vehicle mounting unit 2 and the host vehicle and later re-mounted on vehicle mounting unit 2 prior to host vehicle operation. A detached microprocessor 1 may also be re-mounted either on playback mounting unit 3 or on the vehicle mounting unit 2 of another host vehicle if so desired, as long as the necessary system data reconfiguration reflecting the change is first performed.

Microprocessor module 1 contains microprocessor 20 along with various processing support units which include power supply unit 10, RS232 converter 30, vehicle network converter 31, non-volatile storage device 32, and real time clock 33. Microprocessor 20, which serves as the processing engine for the subject vehicle driver performance monitoring system, comprises CPU 21, microprocessor I/O port 22, serial port 23, internal ROM 24, internal RAM 25, A/D converter 26, and multiplexer 27. Microprocessor 20 is preferably a standard 8-bit microprocessor chip such as a Phillips 8XC562 or other comparable chip commercially available. It incorporates as firmware stored in ROM 24, software for operation of all system components and control of data passage therebetween, as well as software for data processing and evaluation. Driven by this firmware, CPU 21 processes the system-generated parametric data received from vehicle component sensors 40–43 via A/D converter 26 and multiplexer 27.

In certain applications, system data will be available from sources other than the designated vehicle component sensors 40–43. To enable digital communication for the acquisition of parametric system data in such applications, vehicle network converter 31 and RS232 converter 30 are provided to respectively perform the signal conversions necessary to effect digital communication between the serial port 23 of microprocessor 20 and either the vehicle data network resident on the host vehicle or a source having RS232 compatibility.

During the progression of the data processing and evaluation functions performed by microprocessor 20, temporary data storage occurs in RAM 25 internally provided in microprocessor 20. System-generated data, as well as user-provided system configuration data, is stored in a separate non-volatile storage device 32 which, in the preferred embodiment, is a low power RAM, such as the Hitachi HM62256, coupled to the address, data, and control lines of the microprocessor 20 microprocessor BUS. This non-volatile storage device 32 is equipped with a commercially available back-up power and clocking source such as the Dallas semi-conductor DS1216D so that the data contents stored therein may be preserved during those periods when microprocessor module 1 is decoupled from vehicle power or where vehicle power failure occurs. The clocking source is a real time battery-backed clock 33 well known in the art and commercially available which is serially addressed from the microprocessor BUS which time tags all sensor data saved in the non-volatile storage device 32.

Power supply 10 of microprocessor module 1 which is coupled to vehicle power by the mounting of microprocessor module 1 onto vehicle mounting unit 2 makes available the DC supply signals necessary to drive all system components. A switch mode regulator is employed to minimize power consumption and heat dissipation; as an unswitched +5 VDC supply signal is sufficient in driving the microprocessor system while a switched +5 VDC supply signal is preferable in driving the sensors 40–43, signal conditioning units 44, and signal voltage converters 30, 31. Where optional sensors requiring the conventional +12 VDC vehicle power supply signal are used in the system, power supply 10 also filters the vehicle power signal to provide a clean +12 VDC supply. Power supply 10 also includes input and output surge suppressors to reduce the likelihood of damage due to surges that may occur in the vehicle supply voltage.

As already mentioned, microprocessor module 1 must be mounted onto vehicle mounting 2 in order for the vehicle driver performance monitoring system to be operable. Vehicle mounting unit 2 itself may be mounted either directly in the host vehicle's engine or compartment or inside the host vehicle's passenger compartment and is, preferably, a mechanically rigid unit which securely receives and supports microprocessor module 1 while coupling it electrically for operation. The mounting unit 2 includes a plug connector that mates with a matching connector on microprocessor module 1 to concurrently couple power supply 10 to host vehicle power and the lines of multiplexer 27 of microprocessor 20 to the corresponding lines leading to and from the signal conditioners 44 of sensors 40–43.

Also included in the mounting unit 2 is an electronically readable device such as the Dallas semi-conductor DS2224 encoded with a unique identification code (UIC) to designate the given host vehicle. Electrical connections are run between this UIC device 4 and the plug connector of vehicle mounting unit 2 such that when the microprocessor module 1 is mounted to mounting device 2, microprocessor 20 gains serial access to the identification code through its I/O port 22. This connection enables microprocessor 20 to perform system integrity checks as part of each system power-up sequence which insure that the information accumulated for the driver of a designated host vehicle is not erroneously attributed to a driver of a different host vehicle to which the microprocessor module 1 belonging to a designated host vehicle's system is wrongfully or mistakenly removed and mounted.

A plurality of sensors 40–43 are situated in any suitable fashion on various parts of the host vehicle. These sensors include, but are not limited to, ground speed, engine RPM, steering wheel rotation, dual axis tilt, and tri-axis linear and angular acceleration sensors. In the preferred embodiment, host vehicle ground speed is derived from the vehicle's wheel rotation rate measured either with a drive shaft encoder or a tapped link to the vehicle speedometer. The engine RPM is sensed by coupling an inductive coil pick-up device such as a CR magnetics device model 19 to the host vehicle's ignition wire. The host vehicle's steering wheel rotation is measured with a shaft encoder coupled to the vehicle's steering linkage. The host vehicle's lateral tilt is measured with a dual axis tilt sensor such as the Spectron SP5003 preferably mounted at or near the vehicle's inertial center. Finally, the host vehicle's acceleration is preferably measured about each of three orthogonal axes using piezo films such as the AMP ACH-01 films which may be appropriately oriented and applied on suitable surfaces of the vehicle, but are preferably so applied on microprocessor module 1.

Each sensor 40, 41, 42, 43 interfaces with multiplexer 27 of microprocessor 20 through a signal conditioner unit 44 which formats the electrical signal generated by that sensor to bring it within the operating voltage range of microprocessor 20. Each signal conditioner unit 44 includes antialiasing filters and gain/offset adjustment means to convert the output voltage range of the sensor to which it is connected to the 0–+5 VDC range of microprocessor 20. As shown, the analog outputs of signal conditioners 44 are fed to multiplexer 27 for the sequential switching thereby to the analog to digital (A/D) converter 26 which then converts each analog sensor signal into a corresponding 8-bit digital signal.

It should be noted that in an alternate embodiment, vehicle component data may be available directly from the host vehicle's internal data network. Sensors 40–43 may, in that case, not be necessary as the vehicle components data to be measured thereby will have already been measured by resident components on the host vehicle. The data available on the vehicle's data network may then be retrieved by microprocessor 20 through its serial port 23 following the necessary signal conversions performed by vehicle network converter 31. Typically, parameters such as vehicle speed and engine RPM will be available in this manner.

The discussion heretofore has described a "black box" system which, for obvious safety reasons on a vehicle, does not provide for a built-in data read-out and display means to which a driver's attention could be easily diverted. Rather, the subject vehicle driver performance monitoring system provides a playback mounting unit 3 preferably co-located with a remote computer, which includes a connector that links to the lines of I/O port 22 of microprocessor 20 of a mounted microprocessor module 1 and mates with a matching connector having a standard serial data link to the co-located remote computer. The subject system also provides for software which, when installed on a remote computer so linked to microprocessor 20, enables a user to perform a variety of menu-driven functions. These functions include means for: reading into and storing on the given remote computer's data storage medium system data from the data base generated in microprocessor module 1; clearing the generated data base of microprocessor module 1; cataloging the system data read into desired file hierarchies on the remote computer data storage medium; reconfiguring the system configuration data base of microprocessor module 1; reading and resetting the system time on microprocessor module 1; performing various analyses on the generated system data read from microprocessor module 1; and displaying or transferring to a printer raw system data and any analysis results.

To examine or evaluate system data, therefore, a user may connect to microprocessor module 1 via I/O port 22 a portable laptop computer brought into the host vehicle for such purpose. Alternatively, a user may detach microprocessor module 1 from vehicle mounting unit 2, remove that module from its host vehicle to a remote computer site, and then mount that module on the playback mounting unit 3 linked at that site to a standard desktop computer for examination and analysis of data thereon.

The software resident on microprocessor module 1 as firmware stored in microprocessor ROM 24 will now be discussed. This software generally performs system control and system data processing functions. The system control function includes means for managing, reversibly transferring, and storing data within the subject vehicle driver performance monitoring system as well as a means for establishing the interfaces necessary for communication between the microprocessor module 1 and other processing or peripheral equipment external thereto. It also includes means for periodically performing system integrity checks to verify, first, that a given host vehicle to which the microprocessor module 1 is operably mounted is indeed the particular host vehicle for which that microprocessor module 1 is specifically configured; and, second, to set a flag where system parametric conditions indicate that the host vehicle to which a microprocessor module 1 is correctly coupled has been operated without the corresponding operation of that microprocessor module 1. This second check prevents the subject driver performance monitoring system from being bypassed covertly by, for instance, making a record of the odometer reading either passed automatically to the system via the host vehicle's resident data network or read manually, then entered on the system through a remote PC interface.

The system data processing software includes means for sequentially reading raw data generated by each of the vehicle sensors 40–43, time tagging and cataloging that data, and performing various analytical functions on the system data so accumulated. In performing these functions, the system data processing software accesses the system configuration data base to ultimately achieve characterizations of driver performance with respect to at least one or more predetermined driver performance determinants entered in that configuration data base essentially in the form of sensor data weighting coefficients.

Figure 2:
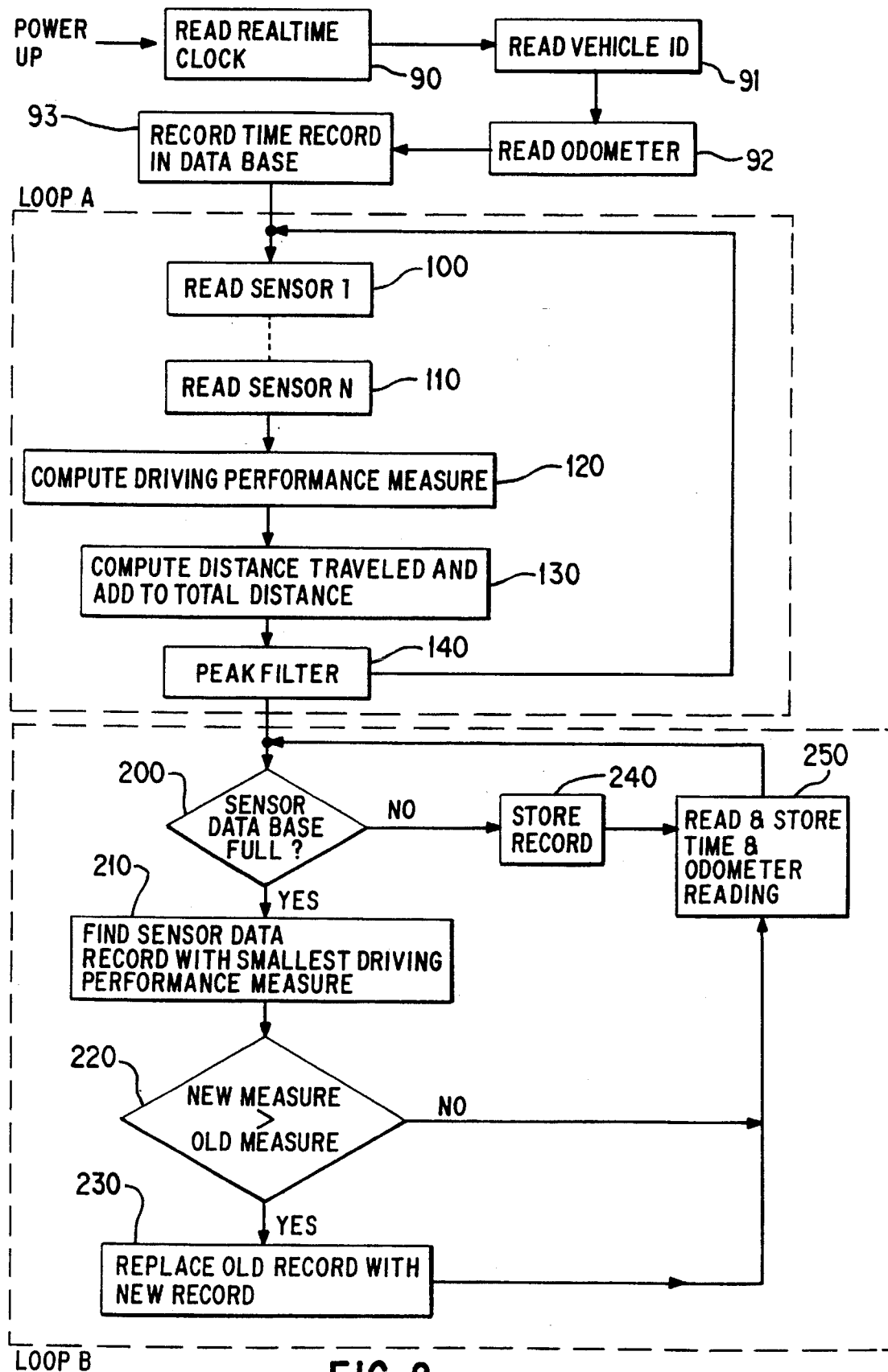
FIG. 2 is a system flow block diagram of the sensor data evaluation and sensor data storage functions in the subject driver performance monitoring system; and, FIG. 3 is a system flow block diagram of the serial port communications function in the subject driver performance monitoring system.
Figure 3:
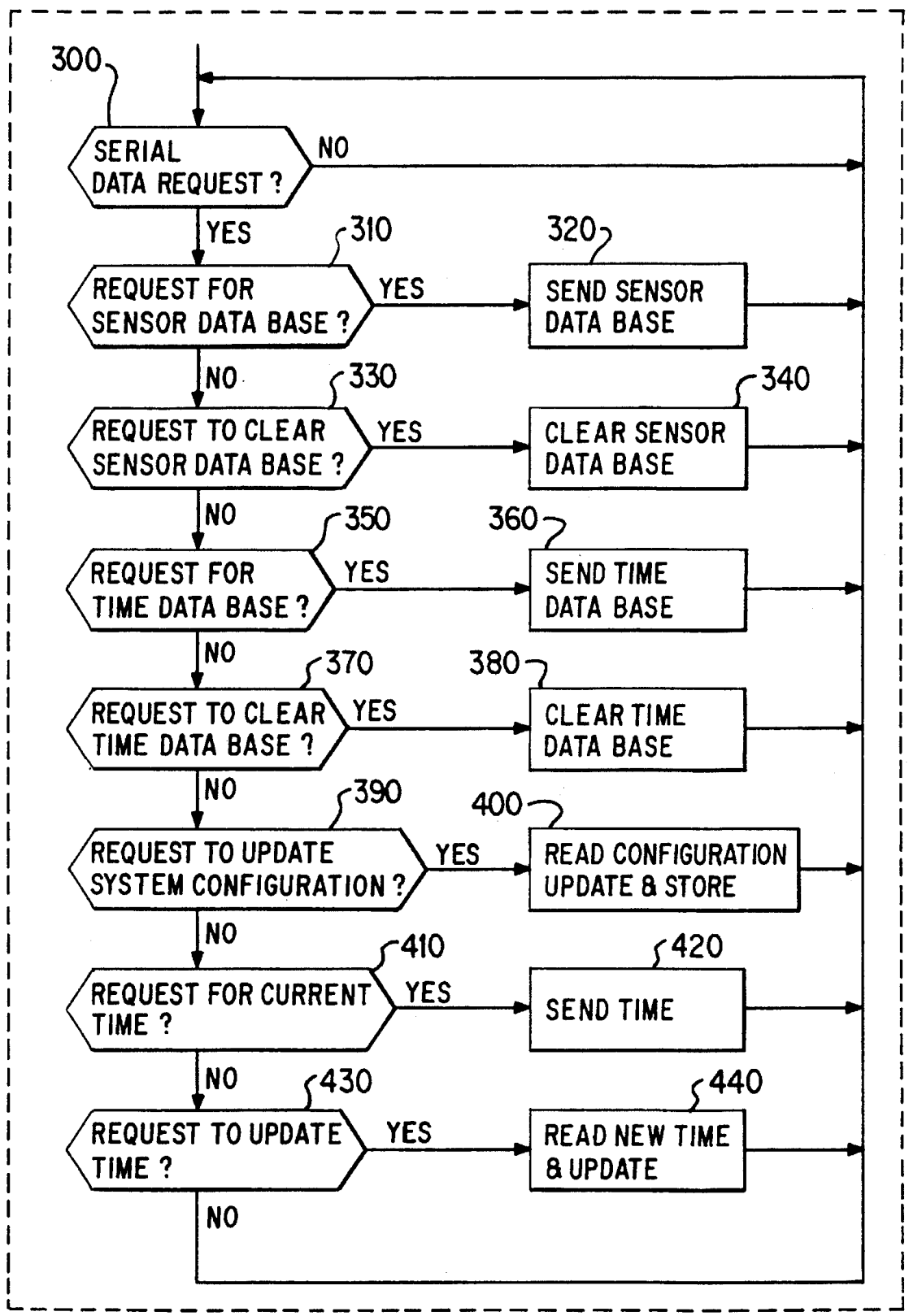

Referring now to FIGS. 2 and 3, the functional progression of the subject vehicle driver performance monitoring system firmware is illustratively depicted in three functional loops: loop A, loop B, and loop C. Loop A which depicts the progression of the system data evaluation function and loop B which depicts the progression of the system data storage function are executed in a synchronous manner in that loop B is executed each processing frame when a peak value is available out of peak filter 140 of loop A. Loop C, illustrated in FIG. 3, which depicts the progression of highest level system control function, is performed asynchronously in relation to loops A and B.

Upon each power-up of the subject vehicle driver performance monitoring system, the real time clock 33, the host vehicle's unique identification code device 4, and the host vehicle's odometer (either through a corresponding sensor or from the vehicle data network) are read for their current values, as indicated in blocks 90–92. A time record comprising current power-up time, time of last system shutdown, host vehicle unique identification code, host vehicle odometer reading at last system shutdown, host vehicle odometer reading at current power-up, and total distance travelled during last operation of the system is formulated and entered on the non-volatile storage medium 32 to update the data base of time records stored thereon. If this time data base is full the oldest time record is deleted as the current time record is added. Prior to deletion of the oldest time record, however, that part of the record indicating total distance travelled during the preceding system operation is noted, and the value is added onto a special total distance travelled overflow record saved as part of the time data base. The preceding time data record data base update functions occur as block 93.

The information contained in the current time record is used to perform initial processing steps prior to the execution of program loops A, B, and C. The pair of time values, each preferably consisting of month, date, year, hour, minute, and second indications, are compared to log the times during which the microprocessor module i was decoupled from host vehicle power. The host vehicle unique identification code is examined to select the correct system configuration data base for the given host vehicle if more than one system configuration data base have been stored in the given microprocessor module 1; and, conversely, to associate the measured sensor data records with the correct host vehicle later during performance evaluation. The odometer readings and the total distance travelled during the preceding system operation are used in making a present determination as to whether or not the given host vehicle was operated without the corresponding operation of its driver performance monitoring system. Immediately following these initial processing steps, execution of program loops A, B and C is begun.

In program loop A, measurement data originating from each of the vehicle sensors 40, 41, 42, 43 is continually read in sequence, as shown in blocks 100,110, in order that a driving performance measure pertaining to the measured sensor data values be computed in block 120 for each set of sensor data reads. The measured data originating from each of the vehicle component sensors 40, 41, 42, 43 represents a coefficient in the computation of this driving performance measure. Where one or more of the expected sensors is not incorporated into the host vehicle or temporarily not functioning, a default coefficient, or sensor value, stored in the system configuration data base is used in place of that missing data when the computation is performed. In block 130, the distance travelled by the host vehicle during the immediately preceding time increment is computed by integrating the host vehicle speed over that increment. This distance measure is then combined with the total distance maintained since system power-up to determine for the current driving performance measure a total distance travelled parameter.

A temporary sensor record comprising the measured sensor data values, the computed driving performance measure, the updated total distance travelled, and the current time is stored in scratch memory as soon as each value is available. This iteration is then repeated over a predetermined number of times over a frame lasting a predetermined number of seconds, N. At the conclusion of each frame, the accumulation of temporary sensor records resulting in scratch memory is sorted to select the temporary resulting sensor record having the highest driving performance measure. That sensor record is then extracted in block 140 by the peak filter, and the next frame of loop A executions is begun. As higher driving performance measures indicate qualitatively worse driving habits, this process notes and passes for storage into the sensor data base in loop B the worst driver performance during the immediately preceding processing frame.

As shown in FIG. 2, loop B executes only once every N second processing frame when the temporary sensor record having the highest driving performance measure is extracted by the peak filter in loop A. Loop B updates the sensor data base maintained in non-volatile storage medium 32 of microprocessor module 1 if sufficient storage space is available, and insures that only the sensor records having the highest driving performance measures are retained. therein if sufficient storage space for all sensor records is not available. The progression of blocks for the case when the non-volatile storage medium 32 is not full occurs as shown in blocks 200, 240, and 250. Where non-volatile storage medium 32 is full, the sensor data record having the lowest driving performance measure is selected from the existing sensor data base in block 210. In block 220, the driving performance measure in the sensor data record so selected in block 210 is then compared with the driving performance measure in the sensor data record currently selected by the peak filter in block 140 of loop A. If the driving performance measure in the currently extracted sensor data record does not exceed the driving performance measure in the old sensor data record selected from the existing sensor data base, execution of loop B immediately proceeds to block 250 where the current time and odometer settings are read and recorded on the non-volatile storage medium 32; then execution is halted until the next frame. If, however, the driving performance measure in the currently extracted sensor data record exceeds the driving performance measure in the old sensor data record, the old sensor data record is replaced with the current sensor data record as shown in block 230. Thereafter, the current time and odometer settings are read and recorded as described in block 250 along with the total distance travelled since the last system power-up.

Referring now to FIG. 3, program loop C, which executes independent of loops A and B, is shown. During each loop, the serial port buffer 23 of microprocessor 20 is checked in block 300 for any remotely-generated data read commands. If no such remote command is present, execution of loop C is halted until after a predetermined time has elapsed, and a check of the serial port 23 buffer is again initiated. If a remotely-generated command either requesting transfer of data from the sensor or time data bases, or requesting a clear of the sensor or time data bases is present, such request is complied with and execution of loop C is halted, as shown in FIGS. 310-380. If, as shown in block 390, a remote command requesting system reconfiguration is present, the new system configuration parameters passed with that command are read, and the non-volatile storage medium 32 of microprocessor module 1 is accordingly updated, as shown in blocks 390–400. Similarly, if a remote command to either send the current time in the real time clock 33 or a request to update that time is received, the appropriate compliance procedures shown in blocks 420 and 440 are followed. After execution of each compliance procedure, loop C halts until a check of the serial port buffer 23 is re-initiated. Any other valid commands remotely passed to serial port 23 may be similarly detected and complied with in loop C.

Although this invention has been described in connection with specific forms,and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combination of system control or system data processing steps may be reversed or interposed, all without departing from the spirit or scope of the invention as defined in the appended claims.

What is claimed is:

1. A vehicle onboard monitoring system for monitoring vehicle driver performance comprising:

(a) a system processor including a microprocessor and a data storage medium coupled to said microprocessor, said microprocessor including means for controlling said vehicle onboard monitoring system and processing vehicle operation data, said means for controlling said vehicle onboard monitoring system including means for input of a current vehicle odometer reading thereto for storage in said data storage medium responsive to energization of said system processor;

(b) a plurality of vehicle sensors coupled to said system processor for input thereto of said vehicle operation data, each of said vehicle sensors transducing an operation parameter of a vehicle component responsive to predetermined vehicle operation data sensed thereby, said means for controlling said vehicle onboard monitoring system including means for performing integrity tests responsive to energization of said system processor, said means for performing integrity tests comparing said current vehicle odometer reading with a determination of total distance previously traveled to detect a first tampering condition;

(c) signal interfacing means coupled to said vehicle sensors and said system processor for filtering and formatting data to be transferred between each of said vehicle sensors and said system processor;

(d) power conversion means coupled to said system processor for converting a vehicle electric power signal format to drive said system processor and said vehicle sensors;

(e) vehicle mounting means coupled to said system processor for operation of said vehicle onboard monitoring system, said vehicle mounting means including means for simultaneously coupling said system processor with said vehicle electric power signal and with said vehicle sensors, said vehicle mounting means having an electronically readable identification code unique to said vehicle, said means for performing integrity tests comparing said electronically readable identification code with a stored code to detect a second tampering condition; and, (f) playback means adapted to be coupled to a remote computer and said system processor for digital communication between said remote computer and said system processor.

2. The vehicle onboard monitoring system as recited in claim 1 where said system processor is detachably coupled to said vehicle mounting means.

3. The vehicle onboard monitoring system as recited in claim 1 where said means for controlling said vehicle onboard monitoring system includes means for managing and reversibly transferring data within said vehicle onboard monitoring system and means for communicating with said remote computer.

4. The vehicle onboard monitoring system as recited in claim 1 where said means for processing said vehicle operation data includes means for reading evaluation, and storing data from at least one of said vehicle sensors.

5. The vehicle onboard monitoring system as recited in claim 1 where said system processor includes memory means for storing predetermined initial values to form a delineated set of system parameters defining a system configuration database, said means for processing said vehicle operation data including means for analyzing said vehicle operation data to characterize driver safe handling performance with respect to at least one predetermined driver performance criterion stored in said system configuration database.

6. The vehicle onboard monitoring system as recited in claim 1 where at least one of said vehicle sensors is a ground speed sensor.

7. The vehicle onboard monitoring system as recited in claim 1 where at least one of said vehicle sensors is an engine tachometric sensor.

8. The vehicle onboard monitoring system as recited in claim 1 where at least one of said vehicle sensors is a steering wheel rotation sensor.

9. The vehicle onboard monitoring system as recited in claim 1 where at least one of said vehicle sensors is a two-axis tilt sensor.

10. The vehicle onboard monitoring system as recited in claim 1 where at least one of said vehicle sensors is a three-axis accelerometer.

11. The vehicle onboard monitoring system as recited in claim 1 where said vehicle operation data is read by said system processor from a data network resident on said vehicle.

12. The vehicle onboard monitoring system as recited in claim 1 where said power conversion means filters and converts said vehicle electric power signal to a +12 Volts DC signal format for driving at least one of said sensors.

13. The vehicle onboard monitoring system as recited in claim 1 where said microprocessor of said system processor includes: (a) internal CPU coupled to internal ROM for processing said vehicle operation data; (b) internal RAM coupled to said internal CPU for storage of temporary data; and, (c) external nonvolatile RAM coupled to said internal CPU for permanent data storage.

14. The vehicle onboard monitoring system as recited in claim 13 where said microprocessor of said system processor includes at least one serial communications port external thereto.

15. The vehicle onboard monitoring system as recited in claim 1 where said vehicle mounting means is coupled to the engine of said vehicle.

16. The vehicle onboard monitoring system as recited in claim 1 where said vehicle mounting means is located within the passenger compartment of said vehicle.

17. The vehicle onboard monitoring system as recited in claim 1 where said playback means includes means programmed into said remote computer for reading and downloading vehicle computer system data responsive to commands prompted by a user of said remote computer.

18. The vehicle onboard monitoring system as recited in claim 17 where said system processor includes memory means for storing predetermined initial values for a delineated set of system parameters defining a system configuration database, said system parameters including vehicle identification code, data evaluation criteria, and driver performance criteria parameters, said system processor including means for reconfiguring said system configuration database in response to commands prompted by said user and a second predetermined value for at least one of said system parameters being transmitted to said system processor from said playback means.

19. A vehicle onboard monitoring system for monitoring safe handling of a vehicle by its driver, comprising:

(a) means for sensing vehicle operation to provide vehicle operation data, said vehicle operation sensing means including a plurality of vehicle sensors, each of said plurality of vehicle sensors transducing an operational parameter of a particular vehicle component to a signal representing a respective portion of said vehicle operation data;

(b) processor means having an input coupled to said plurality of vehicle sensors for controlling said vehicle onboard monitoring system and processing said vehicle operation data, said processor means including (1) a microprocessor having an input coupled to said plurality of vehicle sensors, (2) means for data storage coupled to said microprocessor, and (3) a scratch memory coupled to said microprocessor for temporary data storage, said microprocessor including means for sampling said vehicle operation data a plurality of times during a predetermined time interval for temporary storage in said scratch memory, said microprocessor including means for analyzing each sample of vehicle operation data to establish a driver performance characterization parameter for storage in said scratch memory with a respective sample of said vehicle operation data, said microprocessor including means to transfer one sample of said vehicle operation data and its associated driver performance characterization parameter to said means for data storage subsequent to said predetermined time interval responsive to said associated driver performance characterization parameter indicating poorer driver performance than other of said driver performance characterization parameters stored in said scratch memory, said microprocessor including means for detecting a memory full condition of said means for data storage and replacing a previously stored sample of vehicle operation data and its previously stored associated driver performance characterization parameter with a current sample of vehicle operation data and its associated driver performance characterization parameter responsive to said associated driver performance characterization parameter for said current sample of vehicle operation data indicating poorer driver performance than indicated by said previously stored driver performance characterization parameter;

(c) power conversion means coupled to said processor means for converting a vehicle electric power signal format to drive said processor means and said plurality of vehicle sensors;

(d) vehicle mounting means coupled to said processor means for simultaneously coupling said processor means with said vehicle electric power signal and with said plurality vehicle sensors, said vehicle mounting means including an electronically readable identification code unique to said vehicle; and, (e) playback means adapted to be coupled to a remote computer and said processor means for digital communication between the remote computer and said processor means.

20. The vehicle onboard monitoring system as recited in claim 19 where said microprocessor includes means for input of a vehicle odometer reading thereto for storage in said means for data storage responsive to de-energization or energization of said processor means, said microprocessor further including means for performing integrity tests responsive to energization of said processor means, said means for performing integrity tests comparing a current odometer reading with said odometer reading previously stored responsive to a prior de-energization of said processor means to detect a tampering condition when said odometer readings are not in agreement.

\* \* \* \* \*